US009764750B1

(12) United States Patent
Yoshimatsu et al.

(10) Patent No.: US 9,764,750 B1
(45) Date of Patent: Sep. 19, 2017

(54) APPARATUS AND METHOD OF REDUCING SLIP/SLIDE OF RAILCAR

(71) Applicants: KAWASAKI JUKOGYO KABUSHIKI KAISHA, Kobe-shi, Hyogo (JP); MITSUBISHI ELECTRIC CORPORATION, Tokyo (JP)

(72) Inventors: Yuta Yoshimatsu, Kobe (JP); Takafumi Okamoto, Kobe (JP); Katsuya Ihara, Kobe (JP); Shuhei Matsumoto, New York City, NY (US); Akihiro Murahashi, Tokyo (JP); Satoru Dairiki, Tokyo (JP)

(73) Assignees: KAWASAKI JUKOGYO KABUSHIKI KAISHA, Kobe-shi (JP); MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/221,960

(22) Filed: Jul. 28, 2016

(51) Int. Cl.
*B61L 27/04* (2006.01)
*B61H 13/00* (2006.01)
*B61K 9/00* (2006.01)

(52) U.S. Cl.
CPC .............. *B61L 27/04* (2013.01); *B61H 13/00* (2013.01); *B61K 9/00* (2013.01); *B61L 2201/00* (2013.01)

(58) Field of Classification Search
CPC ....... B61L 27/04; B61L 2201/00; B61K 9/00; B61H 13/00
See application file for complete search history.

(56) References Cited

U.S. PATENT DOCUMENTS

| 7,084,602 | B2* | 8/2006 | Donnelly | ............... | B60L 3/102 180/197 |
| 7,126,293 | B1* | 10/2006 | Kumar | ..................... | B60L 15/36 180/197 |
| 8,897,937 | B2 | 11/2014 | Kawada et al. | | |
| 2001/0035049 | A1* | 11/2001 | Balch | ....................... | B60L 3/10 73/488 |
| 2005/0206230 | A1* | 9/2005 | Donnelly | ................ | B60L 3/102 303/139 |

FOREIGN PATENT DOCUMENTS

JP  2005-289172 A  10/2005
JP  2008-148445 A  6/2008

* cited by examiner

*Primary Examiner* — Rodney Butler
(74) *Attorney, Agent, or Firm* — Oliff PLC

(57) ABSTRACT

A control apparatus mounted on a railcar including a plurality of wheelsets includes: a torque basic value setting portion configured to set a basic value of torque applied to each of the plurality of wheelsets; an adhesion determining portion configured to determine whether or not each of the plurality of wheelsets adheres to a rail; and a torque correcting portion configured to correct the basic value of the torque to obtain a corrected value that is smaller than the basic value. The plurality of wheelsets includes one or more specific wheelsets and one or more general wheelsets other than the specific wheelsets. The torque correcting portion calculates the corrected value of the torque, applied to the general wheelset, in accordance with a first rule and calculates the corrected value of the torque, applied to the specific wheelset, in accordance with a second rule different from the first rule.

6 Claims, 7 Drawing Sheets

APPARATUS AND METHOD OF REDUCING SLIP/SLIDE OF RAILCAR

BACKGROUND OF THE INVENTION

1. Field of the Invention

The present invention relates to an apparatus and method of reducing slip or slide of a railcar.

2. Description of the Related Art

To reduce slip or slide of a wheelset, a railcar may include an apparatus of reducing torque applied to the wheelset that is slipping or sliding.

In JP2005289172A, a highest value among speeds of a plurality of wheels is regarded as a speed of a railcar, and deceleration of each of the wheels is calculated. Regarding the wheel whose deceleration is not more than a threshold, a difference between the speed of such wheel and the speed of the railcar is calculated as a sliding speed of this wheel. Regarding the wheel whose sliding speed exceeds the threshold, braking torque applied to such wheel is reduced.

According to this method, it is difficult to prevent or quickly solve "all-wheelset synchronous slide." The all-wheelset synchronous slide denotes a phenomenon in which all the wheelsets are substantially the same in the number of rotations as one another and are sliding. If the all-wheelset synchronous slide occurs, all the wheels actually slide on a rail, but the differences among the numbers of rotations of the wheelsets become extremely small values, and the sliding speed becomes lower than the threshold. Therefore, the braking torque applied to the wheels is not reduced, and the slide of all the wheels continues.

SUMMARY OF THE INVENTION

An apparatus according to one aspect of the present invention is a control apparatus mounted on a railcar including a plurality of wheelsets, the control apparatus including: a torque basic value setting portion configured to set a basic value of torque applied to each of the plurality of wheelsets; an adhesion determining portion configured to determine whether or not each of the plurality of wheelsets adheres to a rail; and a torque correcting portion configured to, when the adhesion determining portion determines that each of the plurality of wheelsets does not adhere to the rail, correct the basic value of the torque, applied to each of the plurality of wheelsets, to obtain a corrected value that is smaller than the basic value, wherein: the plurality of wheelsets include one or more specific wheelsets and one or more general wheelsets other than the specific wheelsets; and the torque correcting portion calculates the corrected value of the torque, applied to the general wheelset, in accordance with a first rule and calculates the corrected value of the torque, applied to the specific wheelset, in accordance with a second rule different from the first rule.

A method according to another aspect of the present invention is a method of controlling torque applied to each of a plurality of wheelsets of a railcar, the method including: setting a basic value of the torque applied to each of the plurality of wheelsets; determining whether or not each of the plurality of wheelsets adheres to a rail; when it is determined that a general wheelset among the plurality of wheelsets does not adhere to the rail, correcting in accordance with a first rule the basic value of the torque, applied to the general wheelset, to obtain a corrected value that is smaller than the basic value; and when it is determined that a specific wheelset among the plurality of wheelsets other than the general wheelset does not adhere to the rail, correcting in accordance with a second rule the basic value of the torque, applied to the specific wheelset, to obtain a corrected value that is smaller than the basic value, the second rule being different from the first rule.

DETAILED DESCRIPTION OF THE PREFERRED EMBODIMENTS

Figure 1:
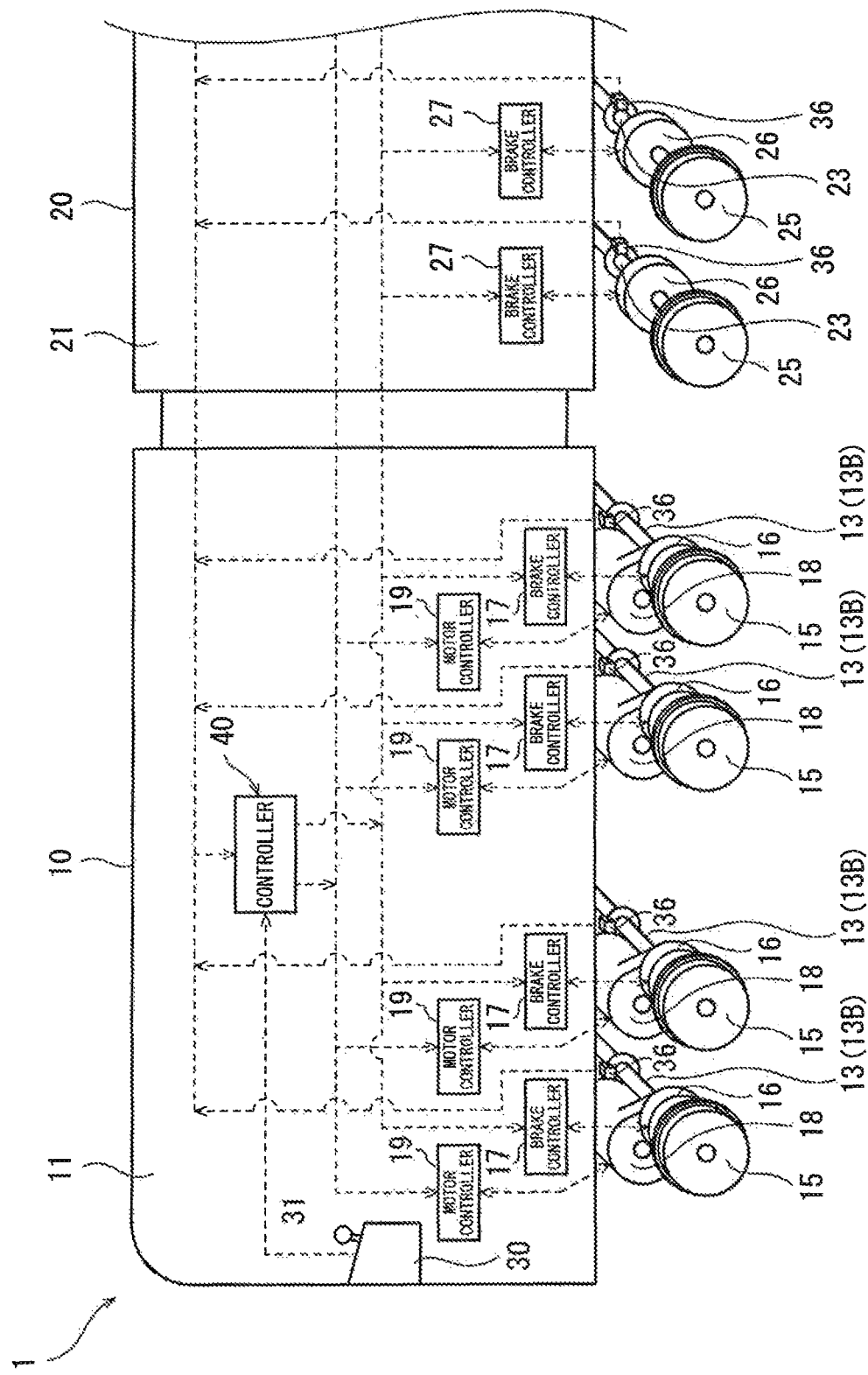
FIG. 1 is a diagram showing a railcar according to an embodiment.

Hereinafter, embodiments will be explained in reference to the drawings. In the drawings, the same reference signs are used for the same or corresponding components, and a repetition of the same explanation is avoided.

Embodiment 1

A "railcar" may be a single car or a set of a plurality of cars sequentially coupled to one another. A railcar 1 shown in FIG. 1 is constituted by a plurality of cars including a first car 10 and a second car 20 coupled to the first car 10. The first car 10 is located at an end of the railcar 1, and the second car 20 may or may not be an intermediate car. In FIG. 1, a left/right direction corresponds to a car lengthwise direction, and a left direction corresponds to a car forward direction.

The first car 10 includes a carbody 11 and two bogies (not shown in detail). The two bogies are arranged away from each other in the car lengthwise direction and support the carbody 11. Each of the bogies includes two wheelsets 13 that roll on a rail (not shown) (reference signs "13A" and "13B" with parentheses shown next to a reference sign "13" in FIG. 1 will be described later). Each of the wheelsets 13 includes two wheels 15 fixed to both respective ends of an axle (one of the two wheels is not shown). The first car 10 includes: a plurality of brakes 16 corresponding to the respective wheelsets 13; and a plurality of brake controllers 17 corresponding to the respective brakes 16. The brakes 16 are, for example, mechanical brakes that perform mechanical friction braking of the wheelsets 13 by external forces (air pressure, for example).

The second car 20 includes a carbody 21 and four wheelsets 23, and each of the wheelsets 23 includes two wheels 25 (a part of wheelsets and one of the two wheels of each wheelset are not shown). The second car 20 also includes brakes 26 and brake controllers 27.

As one example, the first car 10 is a motor car, and the second car 20 is a trailer. The first car 10 as the motor car includes one or more traction motors 18 and one or more motor controllers 19 corresponding to the one or more traction motors 18. For example, all the wheelsets 13 of the first car 10 are driving wheelsets, and the traction motors 18 correspond to the respective wheelsets 13. Each of the traction motors 18 serves as a power source for rotating the corresponding wheelset 13 and also serves as a braking device that performs regenerative braking of the corresponding wheelset 13. It should be noted that a correspondence relation between the wheelset 13 and the traction motor 18 is not limited to one-to-one. The second car 20 as the trailer does not include any traction motor, and the wheelsets 23 are not the driving wheelsets.

As one example, the first car 10 is a controlling car, and the second car 20 is a controlled car. The first car 10 as the controlling car includes a driver's platform 30 and a control apparatus 40. The driver's platform 30 is provided with an operating unit 31 operated by a driver, and the driver inputs a powering command or a braking command to the operating unit 31. The powering command and the braking command denote an acceleration degree and a deceleration degree, respectively, requested by the driver (i.e., these commands are not just on/off commands).

The control apparatus 40 is connected to the operating unit 31, and the powering command or braking command input to the operating unit 31 by the driver is input to the control apparatus 40. The control apparatus 40 is connected to brake controllers 17 and 27 and motor controllers 19. The second car 20 as the controlled car does not include the above control apparatus. The brake controllers 27 of the second car 20 are controlled by the control apparatus 40 provided in a different car (i.e., in the first car 10 as the controlling car), and therefore, the brakes 26 of the second car 20 are controlled by the control apparatus 40.

In accordance with the input powering command, the control apparatus 40 outputs to the motor controllers 19 a value of powering torque to be applied to the wheelsets 13 (i.e., a value of power to be generated by the traction motors 18). When mechanical braking is appropriate, in accordance with the input braking command, the control apparatus 40 outputs to the brake controllers 17 and 27 a value of braking torque to be applied to the wheelsets 13 and 23 by the brakes 16 and 26. Or, when electric braking is appropriate, in accordance with the input braking command, the control apparatus 40 outputs to the motor controllers 19 a value of braking torque to be applied to the wheelsets 13 by the traction motors 18.

To obtain the value of the torque (the value of the powering torque or the value of the braking torque) to be applied to the wheelsets 13 and 23, the control apparatus 40 refers to the powering command or the braking command, and in addition, information input from a detector configured to detect a state of the railcar 1.

When the wheelsets 13 and 23 do not adhere to the rail (in other words, when the wheelsets 13 and 23 slip or slide), the control apparatus 40 outputs a corrected torque value to the controllers 17, 19, and 27 to correct the torque. The control apparatus 40 requires information for determining whether or not the wheelsets 13 and 23 adhere to the rail. Therefore, as one example, the detector includes wheel speed sensors 36 configured to detect rotating speeds of the wheelsets 13 and 23. It should be noted that the term "rotating speed" is used since it is a general term, but the "rotating speed" herein is not limited to a rotating speed [1/s] in the narrow sense. To modify wheel tread shapes of the wheels which are worn by traveling or damaged by slip or slide, the wheels 15 and 25 are subjected to grinding. Therefore, wheel diameters of the wheelsets 13 and 23 are slightly different from one another. The "rotating speed" herein may be a value obtained by correcting the rotating speed in the narrow sense in accordance with the differences of the wheel diameters. When determining whether or not the wheelsets 13 and 23 adhere to the rail, the rotating speeds of the wheelsets 13 and 23 are compared to one another. In this case, speeds to be directly compared to one another are not the rotating speeds [1/s] of the wheelsets 13 and 23 but circumferential speeds [m/s] of wheel treads of the wheels 15 and 25. Therefore, the "rotating speed" may be replaced with the circumferential speed.

Hereinafter, for convenience of explanation, the configuration and actions of the control apparatus 40 will be explained using, as an example, the torque, especially the braking torque, applied to the four wheelsets 13 of the first car 10.

Figure 2:
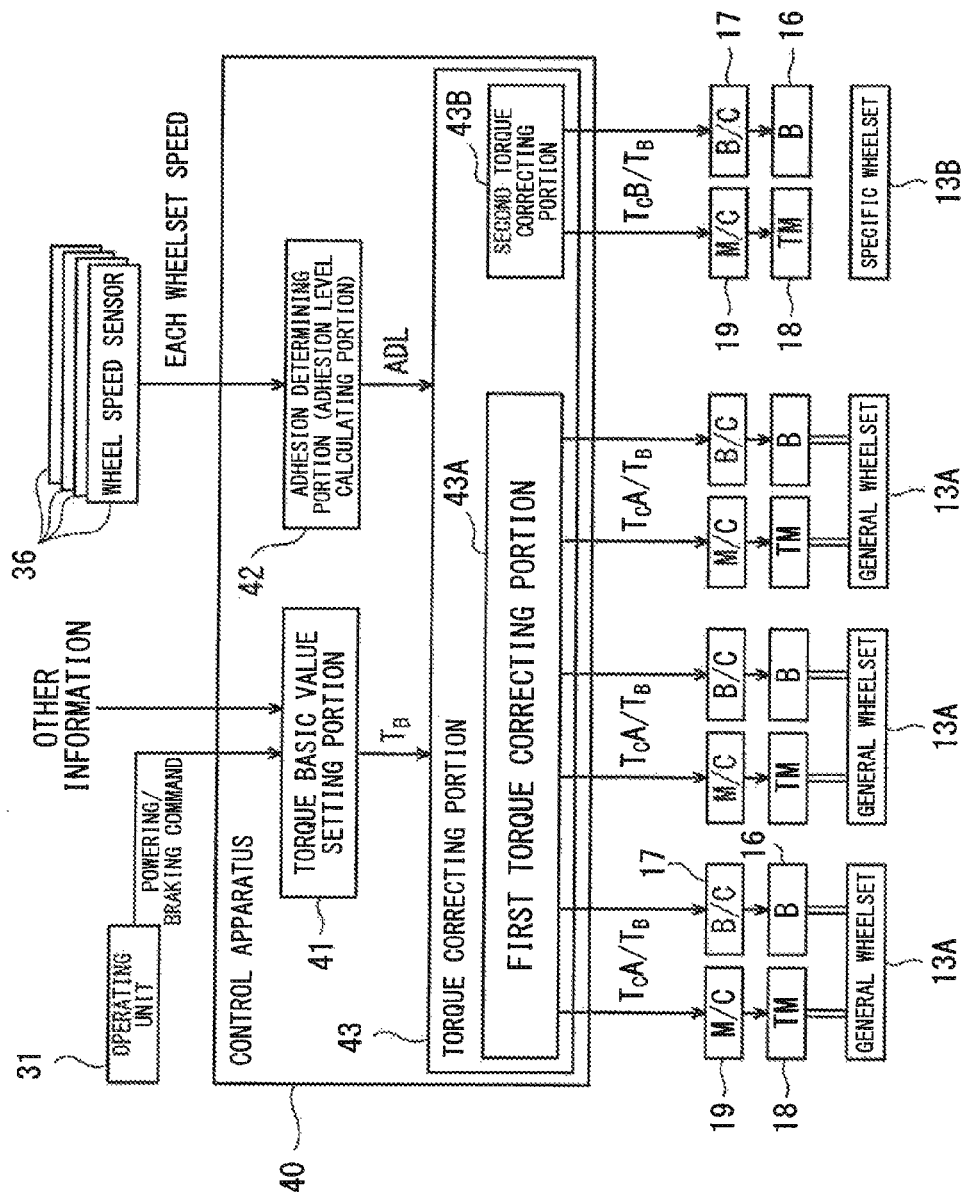
FIG. 2 is a conceptual diagram showing a control apparatus according to the embodiment.

FIG. 2 is a configuration diagram of the control apparatus 40. The control apparatus 40 includes a torque basic value setting portion 41, an adhesion determining portion 42, and a torque correcting portion 43.

The torque basic value setting portion 41 sets a basic value $T_B$ of the torque applied to the wheelsets 13. This "torque" includes powering torque and braking torque. The powering torque that is a positive value is torque that accelerates the car, and the braking torque that is a positive value is torque that decelerates the car. The "basic value $T_B$ of the torque" is a positive value in both a case where the torque is the powering torque and a case where the torque is the braking torque.

The basic value $T_B$ of the braking torque is calculated mainly in accordance with the braking command. The basic value $T_B$ of the powering torque is calculated mainly in accordance with the powering command. Each of the basic value $T_B$ of the braking torque and the basic value $T_B$ of the powering torque may be calculated in reference to other information such as road surface information (cant, gradient, etc.). In the present embodiment, the basic value $T_B$ is commonly used among all the wheelsets 13.

The adhesion determining portion 42 determines whether or not the wheelsets 13 adhere to the rail. This determination is performed for each of the wheelsets 13.

As one example, the adhesion determining portion 42 calculates an "adhesion level ADL" that is an index indicating an adhesion degree (in other words, a slip/slide degree) of the wheelset 13 with respect to the rail. Therefore, the adhesion determining portion 42 also serves as an adhesion level calculating portion that calculates the adhesion level ADL. The adhesion level ADL is measured for each of the wheelsets 13. The adhesion level ADL is an index indicating the adhesion degree as a numerical value, and therefore, is an index that realizes a quantitative evaluation of the adhesion degree. Herein, a large numerical value of the adhesion level ADL denotes that the adhesion degree is high, that is, the slip/slide degree is low. A small numerical value of the adhesion level ADL denotes that the adhesion degree is low, that is, the slip/slide degree is high.

The adhesion determining portion 42 compares the obtained adhesion level ADL with a threshold. When the adhesion level ADL is lower than the threshold, the adhesion determining portion 42 determines that the wheelset 13 does not adhere to the rail (in other words, the wheelset 13 slips or slides on the rail).

For example, the adhesion level ADL is calculated based on the speed of the wheelset 13 detected by the wheel speed sensor 36 and/or acceleration (including negative acceleration; deceleration) obtained from the speed of the wheelset 13. For example, at the time of the slide, the adhesion level ADL may be calculated by dividing a highest value VMAX among the rotating speeds of all the wheelsets 13 by a rotating speed V of any wheelset 13 as a measurement target (ADL=V/VMAX). In accordance with this calculation method, each of the adhesion levels ADL of all the wheelsets 13 becomes a numerical value in a range of 0 to 1. When the adhesion degree is high, the numerical value tends to be large.

When it is determined that the wheelset 13 adheres to the rail, the control apparatus 40 outputs to the motor controller 19 the basic value $T_B$ as the value of the torque to be applied to the wheelset 13.

The torque correcting portion 43 includes a first torque correcting portion 43A and a second torque correcting portion 43B. When the adhesion determining portion 42 determines that the wheelset 13 does not adhere to the rail, each of the first torque correcting portion 43A and the second torque correcting portion 43B corrects the basic value $T_B$ to obtain a corrected value $T_C A$ or $T_C B$, which is smaller than the basic value $T_B$, as the value of the torque to be applied to the wheelset 13. In other words, each of the first torque correcting portion 43A and the second torque correcting portion 43B corrects the torque value from the basic value $T_B$ to the corrected value $T_C A$ or $T_C B$ for the purpose of reducing the slip or the slide. When it is determined that the wheelset 13 does not adhere to the rail, the control apparatus 40 outputs to the motor controller 19 the corrected value $T_C A$ or $T_C B$ as the value of the torque to be applied to the wheelset 13.

The second torque correcting portion 43B corrects the value of the torque to be applied to one or more specific wheelsets 13B among the plurality of wheelsets 13. The first torque correcting portion 43A corrects the value of the torque to be applied to one or more general wheelsets 13A among the plurality of wheelsets 13 other than the specific wheelset(s) 13B. In the present embodiment, the first car 10 includes four wheelsets 13, and these four wheelsets 13 are divided into one specific wheelset 13B and the remaining three general wheelsets 13A. Hereinafter, a reference sign "$T_C A$" may be used for a corrected value for the general wheelset 13A, and a reference sign "$T_C B$" may be used for a corrected value for the specific wheelset 13B, so that these corrected values are distinguished from each other. The specific wheelset 13B is, for example, a wheelset provided at a front end (left end in FIG. 1) in a car proceeding direction.

The first torque correcting portion 43A outputs the corrected value $T_C A$ to one or more (in the present embodiment, three) motor controllers 19 corresponding to the general wheelsets 13A. With this, the torque of the corrected value $T_C A$ is applied to the general wheelsets 13A by the traction motors 18 corresponding to the general wheelsets 13A. The second torque correcting portion 43B outputs the corrected value $T_C B$ to one or more (in the present embodiment, one) motor controllers 19 corresponding to the specific wheelset 13B. With this, the torque of the corrected value $T_C B$ is applied to the specific wheelset 13B by the traction motor 18 corresponding to the specific wheelset 13B.

In accordance with a first rule, the first torque correcting portion 43A calculates the corrected value $T_C A$ of the torque to be applied to the general wheelset 13A. In accordance with a second rule, the second torque correcting portion 43B calculates the corrected value $T_C B$ of the torque to be applied to the specific wheelset 13B. At the time of travel-ling such as asynchronous slide, the torque correcting portion 43 calculates the corrected values $T_C A$ and $T_C B$ in accordance with the first and second rules.

The second rule is different from the first rule. Even when the basic value $T_B$ of the general wheelset 13A and the basic value $T_B$ of the specific wheelset 13B are the same as each other, or even when the adhesion level ADL of the general wheelset 13A and the adhesion level ADL of the specific wheelset 13B are the same as each other, the corrected values $T_C A$ and $T_C B$ are calculated in accordance with different rules, so that the corrected values $T_C A$ and $T_C B$ can be made different in value from each other.

Figure 3A:
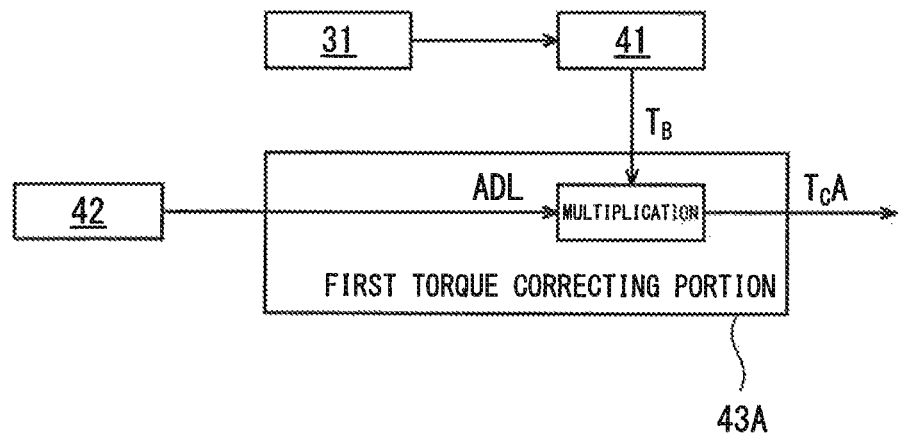
FIG. 3A is a conceptual diagram showing a first torque correcting portion according to Embodiment 1.
Figure 3B:
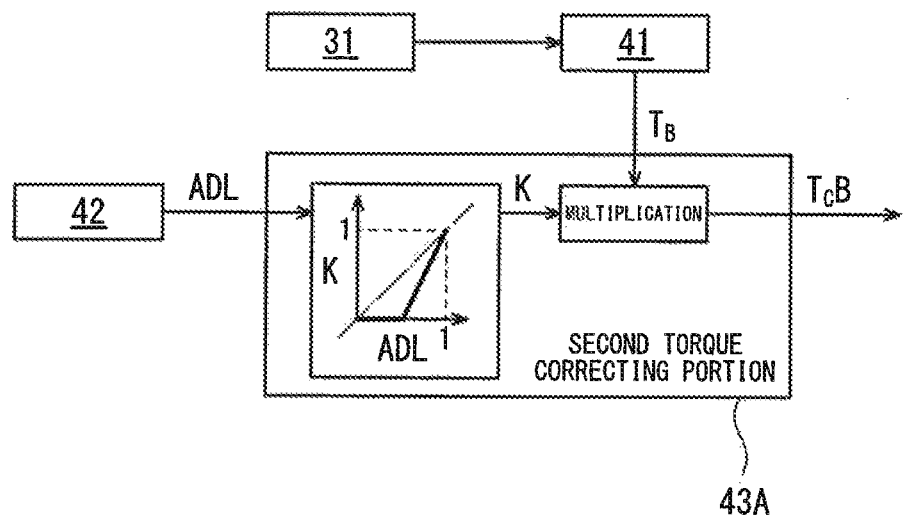
FIG. 3B is a conceptual diagram showing a second torque correcting portion according to Embodiment 1.

FIG. 3A shows the first torque correcting portion 43A, and FIG. 3B shows the second torque correcting portion 43B. Referring to FIG. 3A, the corrected value $T_C A$ is calculated in accordance with the first rule by multiplying the basic value $T_B$ by the adhesion level ADL. In other words, the first rule is a rule in which the corrected value $T_C A$ is made proportional to basic value $T_B$ and also made proportional to the adhesion level ADL. Therefore, the lower the adhesion degree is (smaller the numerical value of the adhesion level ADL is), the smaller the corrected value $T_C A$ becomes.

Referring to FIG. 3B, the corrected value $T_C B$ is calculated in accordance with the second rule by multiplying the basic value $T_B$ by a correction coefficient K. The correction coefficient K by which the basic value $T_B$ is multiplied is not the numerical value of the adhesion level ADL itself. In this regard, the second rule is different from the first rule.

The correction coefficient K is calculated in accordance with the adhesion level ADL. Therefore, the second rule is the same as the first rule in that the corrected values $T_C A$ and $T_C B$ are calculated by "referring" to the index called the adhesion level ADL. However, the second rule is different from the first rule in that after the adhesion level ADL is obtained and before the corrected value $T_C B$ is calculated using the basic value $T_B$, the correction coefficient K is calculated in accordance with the adhesion level ADL.

The correction coefficient K is obtained by correcting the numerical value of the adhesion level ADL presumed from the speed of the wheelset 13. As one example, the correction coefficient K is obtained by decreasingly correcting the numerical value of the adhesion level ADL. Regarding the general wheelset 13A, the corrected value $T_C A$ is calculated so as to be made proportional to the adhesion level ADL presumed from the speed of the wheelset 13. On the other hand, regarding the specific wheelset 13B, the adhesion level ADL is corrected to obtain such a correction coefficient K that the slip/slide degree is larger than the adhesion degree presumed from the speed of the wheelset 13, and the corrected value $T_C B$ is made proportional to the obtained correction coefficient K. Regarding the specific wheelset 13B, the torque value is corrected such that sensitivity to the occurrence of the slip/slide becomes higher than that regarding the general wheelset 13A.

As one example of the correspondence relation between the adhesion level ADL and the correction coefficient K, when the adhesion level is one, the correction coefficient K is also one. When the adhesion level is zero, the correction coefficient K is also zero. While the adhesion level changes from zero to a predetermined value, the correction coefficient K is maintained at zero. While the adhesion level changes from the predetermined value to one, the correction coefficient K linearly changes from zero to one.

When the corrected value $T_C B$ is calculated as above, and the wheelsets do not adhere to the rail, the torque reduction of the specific wheelset 13B becomes larger than that of the general wheelset 13A. Therefore, the slide of the specific wheelset 13B can be quickly solved, and the adhesion level ADL promptly recovers to a level lower than the threshold. Therefore, the torque applied to the specific wheelset 13B promptly recovers to the basic value Ts (or a value close to the basic value $T_B$). With this, the slide of the specific wheelset 13B may occur again. Even in such a case, the torque of the specific wheelset 13B significantly reduces again. After that, the torque promptly recovers as with the above. Therefore, according to the specific wheelset 13B, the significant torque reduction, the recovery of the grip thereby, the recovery of the torque, and the re-slide thereby are repeated in short cycles.

On the other hand, regarding the general wheelset 13A, the torque reduction in accordance with the adhesion level ADL presumed from the wheel speed, the recovery of the adhesion degree thereby, the torque recovery thereby, and the decrease in the adhesion degree again thereby are repeated in cycles longer than the cycles of the specific wheelset 13B.

As above, the corrected value $T_CA$ of the general wheelset 13A and the corrected value $T_CB$ of the specific wheelset 13B are different from each other, and calculating methods thereof are also different from each other. Therefore, a probability that the rotating speed and adhesion level ADL of the specific wheelset 13B and the rotating speed and adhesion level ADL of the general wheelset 13A become the same as each other can be significantly reduced, that is, a probability that the all-wheelset synchronous slide or all-wheelset synchronous slip occurs can be significantly reduced. Even if there is a moment when the rotating speed and adhesion level ADL of the specific wheelset 13B and the rotating speed and adhesion level ADL of the general wheelset 13A are the same as each other, the first rule and the second rule are different from each other, so that the corrected values $T_CA$ and $T_CB$ become different from each other under conditions of the same rotating speeds and the same adhesion levels. In the present embodiment, the corrected value $T_CB$ for the specific wheelset 13B is set to a value smaller than the corrected value $T_CA$ for the general wheelset 13A. Therefore, the rotating speed and adhesion level ADL of the specific wheelset 13B and the rotating speed and adhesion level ADL of the general wheelset 13A promptly become different from each other. To be specific, even if the all-wheelset synchronous slide occurs, it can be solved quickly.

Figure 4A:
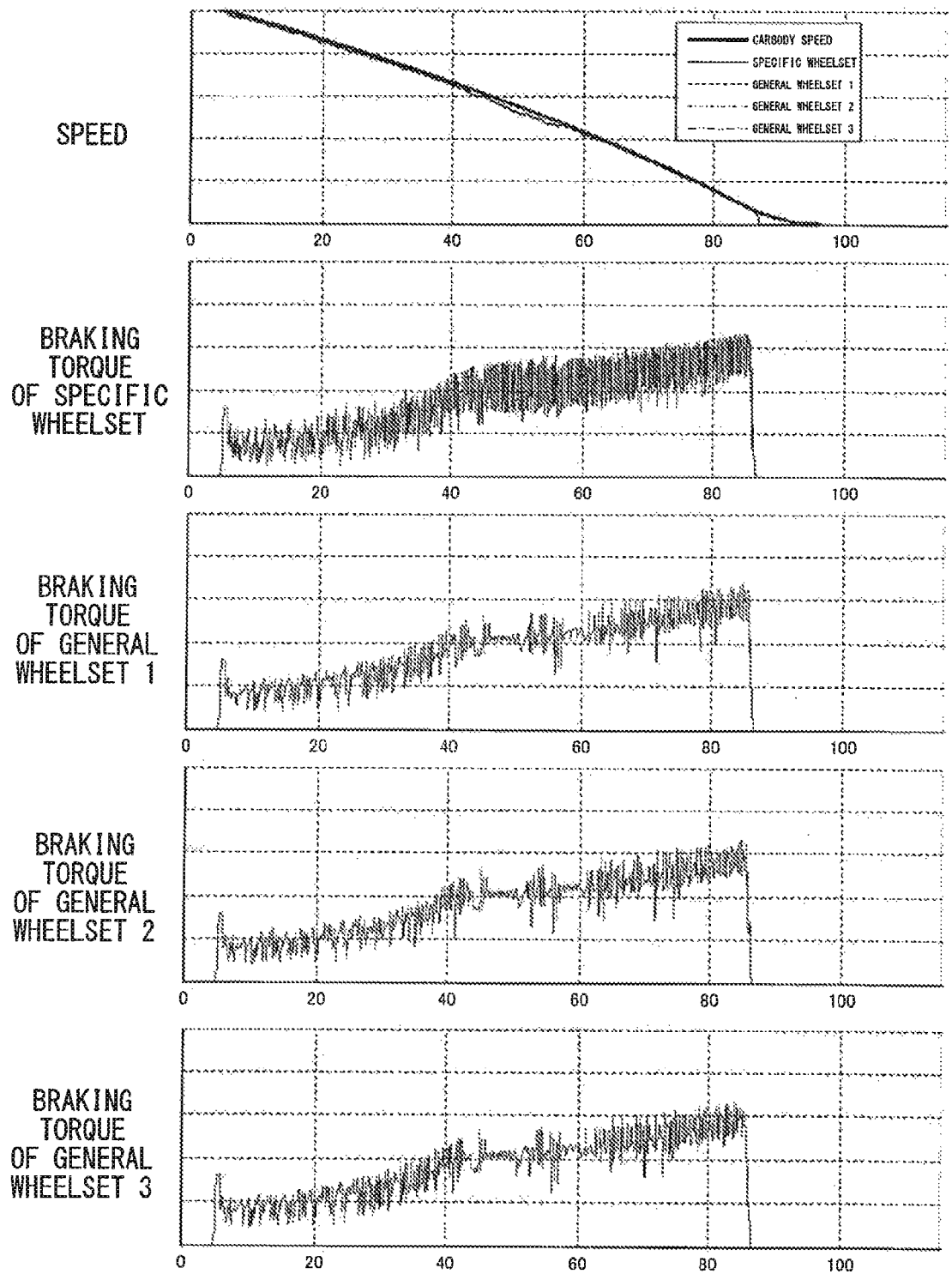
FIG. 4A shows speeds and braking torque when control operations according to Embodiment 1 are executed.
Figure 4B:
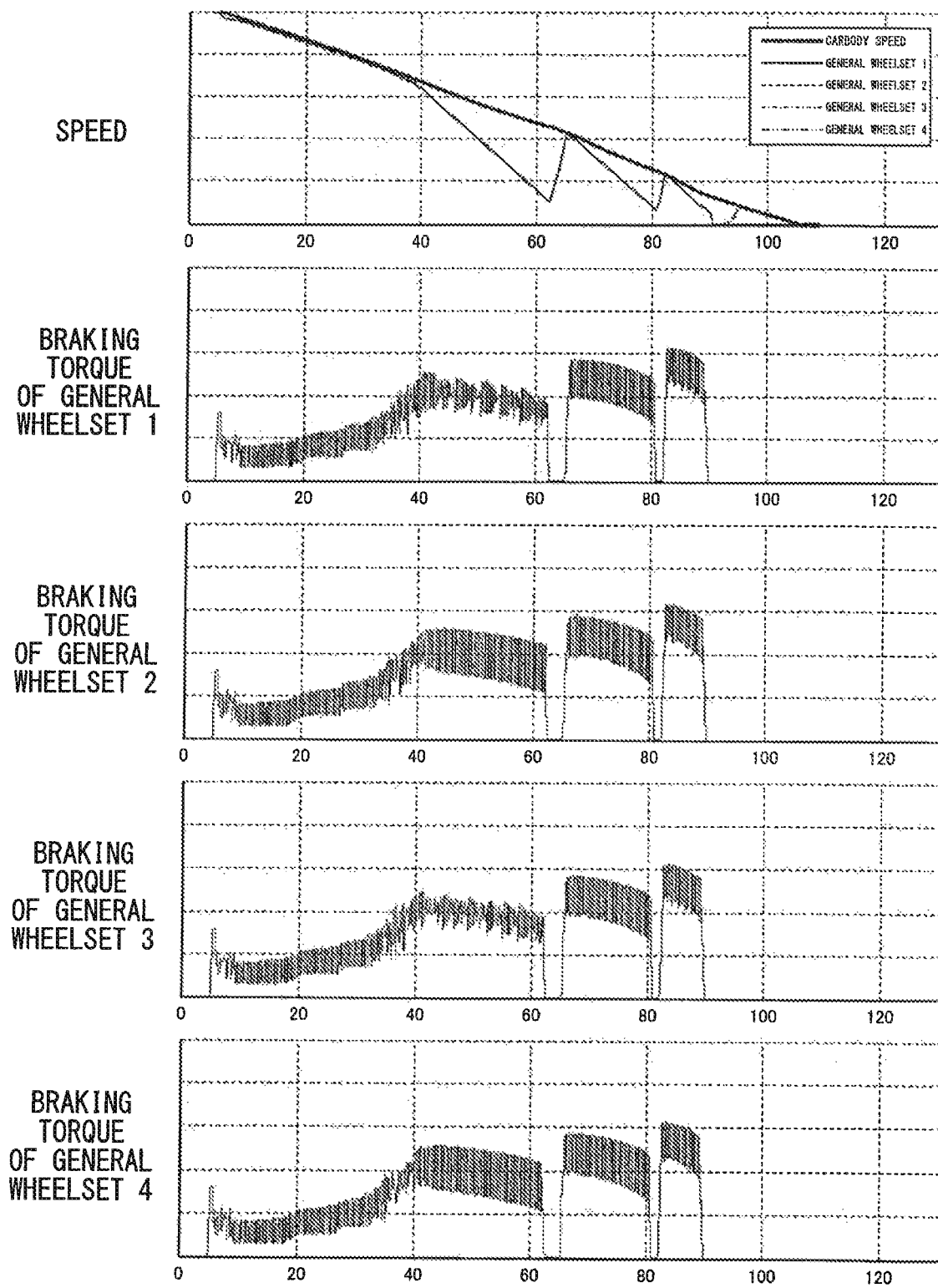
FIG. 4B shows speeds and the braking torque according to Comparative Example.

FIG. 4A is a diagram showing speeds and braking torque when control operations according to the present embodiment are executed. FIG. 4B is a diagram showing speed and braking torque when control operations according to Comparative Example are executed. In Comparative Example, regarding all the wheelsets, the first rule is used when calculating the corrected value of the torque after it is determined that the wheelset does not adhere to the rail. In each of FIGS. 4A and 4B, an upper graph shows the speeds of the wheelsets and the speed of the carbody, and lower graphs show the braking torque applied to the wheelsets, in other words, command values of the braking torque calculated by the torque correcting portion 43.

As is clear from the comparison between FIGS. 4A and 4B, in Comparative Example, the braking torque keeps on being the same among all the wheelsets. Therefore, if the all-wheelset synchronous slide starts, it cannot be solved, and the slide degree increases. In this sliding state, the deceleration of the car is low, and the wheel 15 tends to be damaged by the occurrence of, for example, wheel flat. The slide is detected when the slide degree increases to a certain degree. With this, the torque is reduced, and the adhesion recovers. However, since the torque of all the wheelsets is uniformly reduced at this time, the carbody travels forward by inertia without receiving a braking force. Therefore, a time from when the braking is started until when the speed of the carbody becomes zero becomes long, and therefore, a braking distance becomes long. On the other hand, in the present embodiment, the rule for correcting the torque at the time of the slide is made different between the general wheelset 13A and the specific wheelset 13B. Therefore, even when the synchronous slide of the general wheelsets 13A occurs, the number of rotations of the general wheelset 13A and the number of rotations of the specific wheelset 13B are different from each other, so that the sliding states of the general wheelsets 13A can be detected in an extremely short period of time, and the torque applied to the general wheelsets 13A can be corrected immediately. Thus, all the general wheelsets 13A can be caused to promptly adhere to the rail, and the synchronous slide of all the general wheelsets 13A for a long period of time can be prevented. Further, even when the slide of the specific wheelset 13B occurs, the number of rotations of the general wheelset 13A and the number of rotations of the specific wheelset 13B are different from each other, so that the sliding state of the specific wheelset 13B can be detected in an extremely short period of time, and the torque applied to the specific wheelset 13B can be corrected immediately. Thus, the specific wheelset 13B can be caused to promptly adhere to the rail, and the slide of the specific wheelset 13B for a long period of time can be prevented. With this, a braking time and a braking distance can be made short, so that the practical deceleration can be made high. In addition, since the change in the deceleration is small (a jerk is maintained low), the ride quality improves.

The method of controlling the braking torque of the electric braking according to the above embodiment is also applicable to a method of controlling the braking torque of the mechanical friction braking applied to the wheelsets 13 of the first car 10 and the wheelsets 23 of the second car 20 by the brakes 16 and 26. Further, the method of controlling the torque according to the above embodiment is effective to not only the control operations at the time of the slide but also the control operations at the time of the slip during powering (accelerating) and is also applicable to a control method for the recovery to the adhesion state from the slip caused by the powering torque applied to the wheelsets 13 of the first car 10 from the traction motors 18.

The same effects as above can be obtained at the time of the powering. To be specific, in a case where the first rule is applied regarding all the wheelsets when calculating the corrected value of the torque after it is determined that the wheelset does not adhere to the rail, the powering torque values for all the wheelsets keep on being the same as one another. Therefore, if the all-wheelset synchronous slip starts, it cannot be solved, and the slip degree increases. In this slipping state, the acceleration of the car is low, and the rail tends to be damaged by the slipping wheel 15. The slip is detected when the slip degree increases to a certain degree. With this, the torque is reduced, and the adhesion recovers. However, since the torque of all the wheelsets is uniformly reduced at this time, the carbody travels forward by inertia without receiving an accelerating force. Therefore, a time from when the accelerating is started until when the speed of the carbody reaches a target speed becomes long, and therefore, the practical acceleration becomes low.

On the other hand, in the present embodiment, the rule for correcting the torque of the general wheelset 13A at the time of the slip and the rule for correcting the torque of the specific wheelset 13B at the time of the slip are made different from each other. Therefore, even when the synchronous slip of the general wheelsets 13A occurs, the number of rotations of the general wheelset 13A and the number of rotations of the specific wheelset 13B are different from each other, so that the slipping states of the general wheelsets 13A can be detected in an extremely short period of time, and the torque applied to the general wheelsets 13A can be corrected immediately. Thus, all the general wheelsets 13A can be caused to promptly adhere to the rail, and the synchronous slip of all the general wheelsets 13A for a long period of time can be prevented. Further, even when the slip of the specific wheelset 13B occurs, the number of rotations of the general wheelset 13A and the number of rotations of the specific wheelset 13B are different from each other, so that the slipping state of the specific wheelset 13B can be detected in an extremely short period of time, and the torque applied to the specific wheelset 13B can be corrected immediately. Thus, the specific wheelset 13B can be caused to promptly adhere to the rail, and the slip of the specific wheelset 13B for a long period of time can be prevented. With this, a slipping time can be made short, so that the practical acceleration can be made high. In addition, since the change in the acceleration is small (a jerk is maintained low), the ride quality improves.

Embodiment 2

Figure 5:
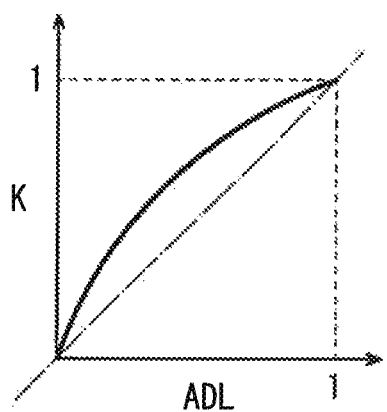
FIG. 5 is a graph showing a correspondence relation between an adhesion level and a correction coefficient which are applied in a second rule according to Embodiment 2.

FIG. 5 is a graph showing a method of calculating the correction coefficient K according to Embodiment 2. A correspondence relation between the adhesion level ADL and the correction coefficient K is not limited to the relation shown in FIG. 3B. The correction coefficient K is only required to be set so as not to decrease as the adhesion level ADL increases. It should be noted that such setting is also made in FIG. 3B. To be specific, when the adhesion level ADL is less than a predetermined value, the correction coefficient K becomes a constant value regardless of the adhesion level ADL. When the adhesion level ADL exceeds the predetermined value, the correction coefficient K monotonically increases in accordance with the adhesion level ADL.

As shown in FIG. 5, the correction coefficient K may be larger in value than the adhesion level ADL. In this case, unlike Embodiment 1, regarding the specific wheelset 13B, the sensitivity to the decrease in the adhesion degree is made low. Therefore, under the conditions of the same rotating speeds and the same adhesion levels, the corrected value $T_CB$ for the specific wheelset 13B is set to be larger than the corrected value $T_CA$ for the general wheelset 13A. On this account, the cycle of the torque reduction and recovery and the cycle of the recovery of the adhesion degree and the decrease of the adhesion degree again regarding the specific wheelset 13B become larger than those regarding the general wheelset 13A. Even when such setting is made, as with Embodiment 1, the all-wheelset synchronous slide and the all-wheelset synchronous slip are prevented or quickly solved.

Embodiment 3

Figure 6A:
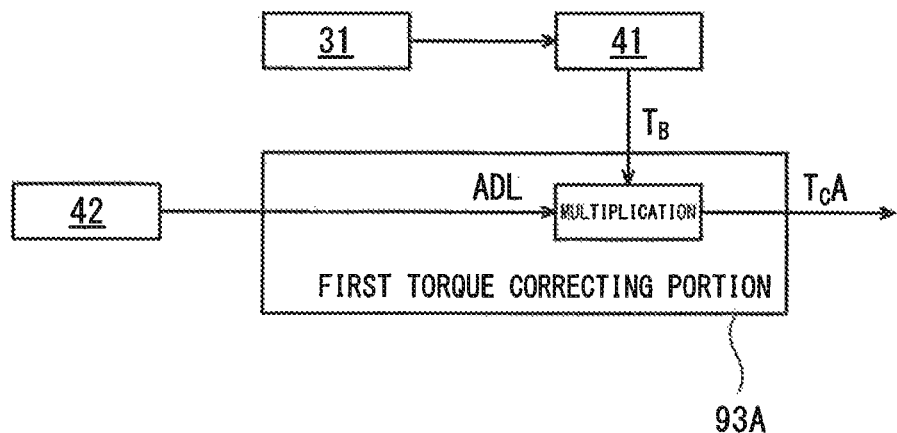
FIG. 6A is a conceptual diagram showing the first torque correcting portion according to Embodiment 3.
Figure 6B:
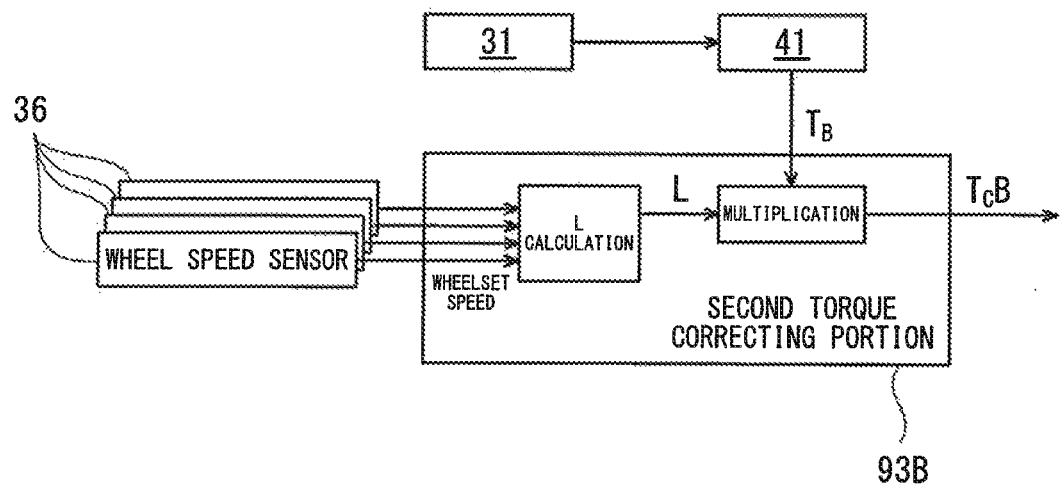
FIG. 6B is a conceptual diagram showing the second torque correcting portion according to Embodiment 3.

FIG. 6A shows a first torque correcting portion 93A of Embodiment 3, and FIG. 6B shows a second torque correcting portion 93B of Embodiment 3. The first torque correcting portion 93A calculates the corrected value $T_CA$ for the general wheelset 13A (see FIG. 1) in accordance with a first rule that is the same as the first rule of Embodiment 1. The second torque correcting portion 93B calculates the corrected value $T_CB$ for the specific wheelset 13B (see FIG. 1) in accordance with a second rule that is different from the first rules of Embodiments 1 and 3 and also different from the second rule of Embodiment 1. Hereinafter, this difference in Embodiment 3 will be mainly explained.

Referring to FIG. 6B, the corrected value $T_CB$ is calculated in accordance with the second rule by multiplying the basic value $T_B$ by a parameter value L that is different from the adhesion level. In the second rule of Embodiment 1, the correction coefficient K (see FIG. 3B) is calculated in accordance with the adhesion level. However, in the second rule of Embodiment 3, the parameter value L is calculated regardless of the adhesion level. As above, the second rule is different from the first rule in that the type of parameter that is referred for calculating the corrected value $T_CB$ is different. The parameter value L is not especially limited but may be, for example, a value obtained by subtracting a rotating speed VB of the specific wheelset 13B from a highest value VMAX among the rotating speeds of all the wheelsets 13 (L=VMAX−VB). Therefore, the detected values of the wheel speed sensors 36 are input to the second torque correcting portion 93B.

In the present embodiment, the corrected values $T_CA$ and $T_CB$ are different from each other, and calculation methods thereof are also different from each other. Therefore, the probability that the all-wheelset synchronous slide or the all-wheelset synchronous slip occurs can be significantly reduced. Further, even if the all-wheelset synchronous slide or the all-wheelset synchronous slip occurs, it can be quickly solved.

Modified Example

The present invention is not limited to the above embodiments, and modifications, additions, and eliminations may be made.

As examples of the first rule and the second rule, the foregoing has explained four rules that are: the rule for calculating the corrected value for the general wheelset in Embodiments 1 and 3; the rule for calculating the corrected value for the specific wheelset in Embodiment 1; the rule for calculating the corrected value for the specific wheelset in Embodiment 2; and the rule for calculating the corrected value for the specific wheelset in Embodiment 3. Any two of these four rules may be selected as the first rule and the second rule.

The number of specific wheelsets 13B is not limited to one. The number of general wheelsets 13A is not limited to three. When two or more of the cars of the railcar 1 are motor cars, the specific wheelset 13B may be set in each of the motor cars or may be set in only one of the motor cars. All the wheelsets of a certain motor car may be set as the general wheelsets 13A.

The power source of the railcar 1 is not limited to the traction motor 18. The railcar 1 may include a diesel car, and the control apparatus 40 may control the powering torque applied to the driving wheelset by an internal combustion engine (a diesel engine, for example) mounted as the power source on the diesel car.

Two or more control apparatuses 40 may be provided in a single railcar and may perform distributed control of a plurality of controllers (motor controllers, brake controllers, or diesel engine controllers) provided in the railcar.

What is claimed is:

1. A control apparatus mounted on a railcar including a plurality of wheelsets, the control apparatus comprising:
a torque basic value setting portion configured to set a basic value of torque applied to each of the plurality of wheelsets;
an adhesion determining portion configured to determine whether or not each of the plurality of wheelsets adheres to a rail; and
a torque correcting portion configured to, when the adhesion determining portion determines that each of the plurality of wheelsets does not adhere to the rail, correct the basic value of the torque, applied to each of the plurality of wheelsets, to obtain a corrected value that is smaller than the basic value, wherein:
the plurality of wheelsets include one or more specific wheelsets and one or more general wheelsets other than the specific wheelsets; and
the torque correcting portion calculates the corrected value of the torque, applied to the general wheelset, in accordance with a first rule and calculates the corrected value of the torque, applied to the specific wheelset, in accordance with a second rule different from the first rule.

2. The control apparatus according to claim 1, further comprising an adhesion degree measuring portion configured to measure adhesion degrees of the wheelsets, wherein:
each of the corrected value for the specific wheelset and the corrected value for the general wheelset is calculated by reducing the basic value in accordance with the measured adhesion degree; and
a correction amount of the basic value in accordance with the adhesion degree in the first rule is different from that in the second rule.

3. The control apparatus according to claim 2, wherein the adhesion determining portion compares each of the measured adhesion degrees of the plurality of wheelsets with a threshold to determine whether or not each of the plurality of wheelsets adheres to the rail.

4. The control apparatus according to claim 2, wherein under a condition of the same adhesion degrees, the corrected value for the specific wheelset is set to be smaller in value than the corrected value for the general wheelset.

5. The control apparatus according to claim 1, wherein a parameter referred to calculate the corrected value from the basic value in the first rule is different from that in the second rule.

6. A method of controlling torque applied to each of a plurality of wheelsets of a railcar, the method comprising:
setting a basic value of the torque applied to each of the plurality of wheelsets;
determining whether or not each of the plurality of wheelsets adheres to a rail;
when it is determined that a general wheelset among the plurality of wheelsets does not adhere to the rail, correcting in accordance with a first rule the basic value of the torque, applied to the general wheelset, to obtain a corrected value that is smaller than the basic value; and
when it is determined that a specific wheelset among the plurality of wheelsets other than the general wheelset does not adhere to the rail, correcting in accordance with a second rule the basic value of the torque, applied to the specific wheelset, to obtain a corrected value that is smaller than the basic value, the second rule being different from the first rule.

* * * * *